UNITED STATES PATENT OFFICE.

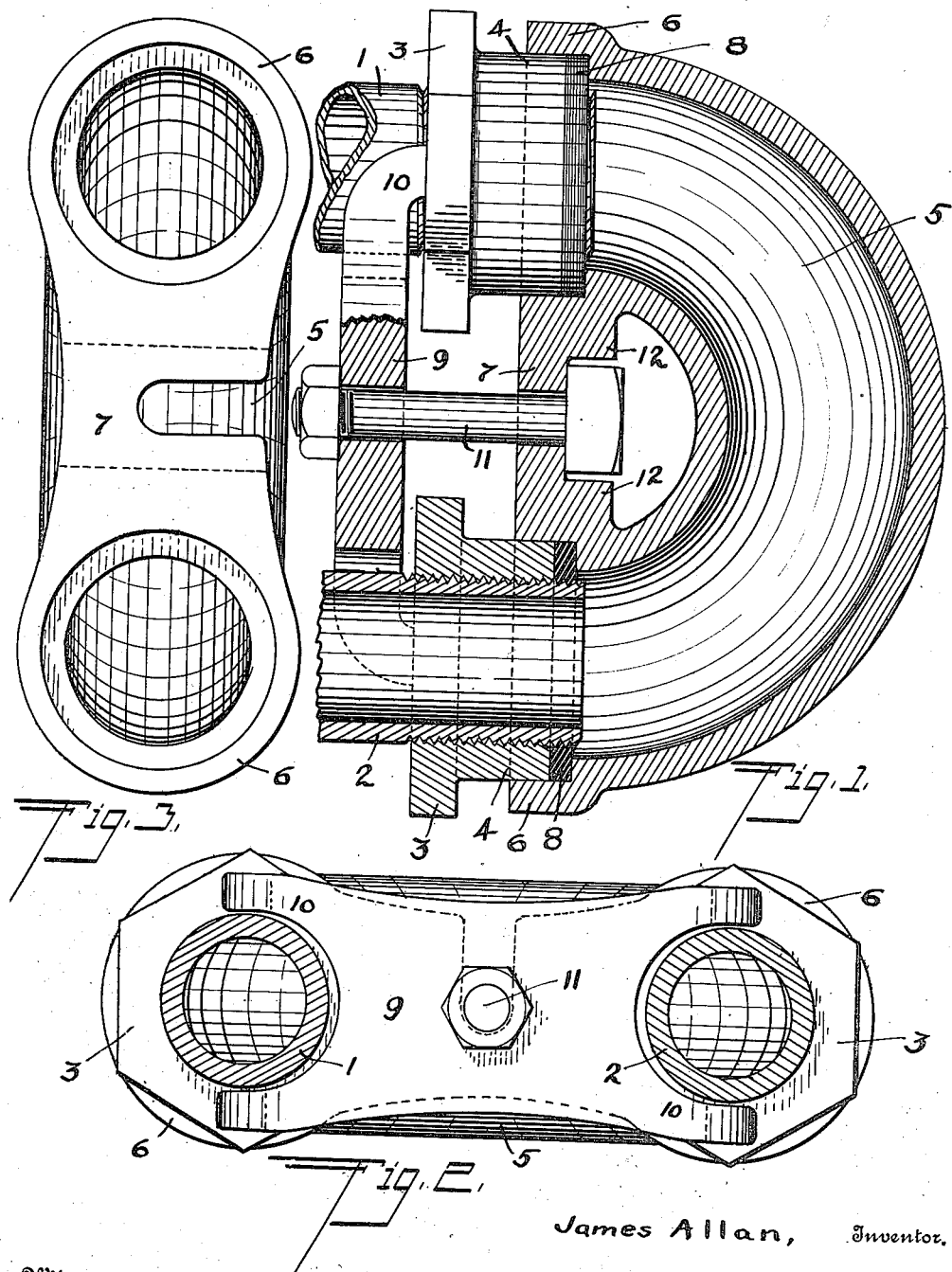

JAMES ALLAN, OF OMAHA, NEBRASKA, ASSIGNOR TO LARSEN-BAKER ICE MACHINE CO., A CORPORATION OF NEBRASKA.

RETURN-BEND PIPE CONNECTION.

1,001,798.   Specification of Letters Patent.   Patented Aug. 29, 1911.

Application filed July 26, 1909. Serial No. 509,741.

*To all whom it may concern:*

Be it known that I, JAMES ALLAN, a citizen of the United States, and a resident of Omaha, in the county of Douglas and State of Nebraska, have invented certain new and useful Improvements in Return-Bend Pipe Connections, of which the following is a specification.

My invention relates to pipe fittings and connections, especially to return bends or fittings for connecting the adjoining ends of parallel pipes, such as are employed in forming the coils used for cooling or heating water, brine and the like, in refrigerating and heating systems. It is the object of my invention to provide a fitting of this character of simple and inexpensive construction, which will require a minimum of machine work in its manufacture, which can be easily and quickly removed for cleaning out the pipes without changing the positions thereof, in which rusting or corrosion of the parts will not prevent the disconnecting thereof, and in which the joints formed will have a measure of elasticity so as to accommodate expansion and contraction of the pipes due to changes in the temperature thereof.

Constructions embodying my invention are illustrated in the accompanying drawings, in which—

Figure 1 is a sectional view of the connection, taken through one of the pipes and in the plane of the bend, Fig. 2 is an end view of the connection, and Fig. 3 is an elevation showing the open ends of the bend body.

In the drawings, 1 and 2 represent the pipes which are connected by the fitting. On the ends of the pipes are loosely threaded the nuts 3 which have hexagonal head portions and cylindrical neck portions or nipples 4. The bend body comprises a semi-annular tubular portion 5, having outwardly shouldered end portions 6, which portions are connected by the cross-bar or web 7. In the ends of the portions 6, adjoining the bore thereof, are annular recesses in which are placed the gaskets 8 of compressible resilient material. The diameter of the annular recesses containing the said gaskets is slightly greater than that of the nipples 4, so that the latter may enter the same and bear upon the gaskets, and the nuts are so arranged upon the pipes that the ends of the pipes extend into the bore of the bend body past the gaskets.

Between the pipes 1 and 2 and adjoining the end faces of the nuts 3 is arranged the bar or yoke 9 which has forked ends 10 adapted to engage the end faces of the nuts on opposite sides of the pipes. At the center of the yoke is an opening through which is passed a bolt 11. The said bolt extends through a slot made in one side of the cross-bar or web 7 of the bend body and the head of the bolt engages the inner face of said web between the shoulders 12 thereon, which shoulders serve to engage the sides of the head and prevent the bolt from turning when the nut thereof is turned in screwing the same on or off the bolt. When the parts are in position the ends of the nipples 4 engage the gaskets in the recessed ends of the bend body, so that tightening of the bolt 11 compresses the gaskets and forces them into such intimate contact with the pipes and the bend body that a perfectly tight joint is made thereby.

It will be seen that as the joint is made solely by the gaskets, the threading of the nuts upon the pipes need not be perfect, since said threads are not used in forming the joint but merely as a means of connecting the nuts with the pipes. It will also be obvious that the ends of the pipes need not be accurately alined since any inequality thereof may be compensated by turning the nuts until the same are properly alined with each other. All of the parts being loosely fitted, corrosion thereof will not prevent the disconnecting of the fitting when necessary for cleaning the pipes or the like. The retention of the fitting by means of a single bolt enables rapid assembling or disconnecting of the parts, and should the bolt become corroded so that it is broken in disconnecting the fitting, it may be cheaply replaced.

Now, having described my invention, what I claim and desire to secure by Letters Patent is:

1. In a pipe connection of the class described, a semi-annular tubular body having a web connecting the ends thereof and recesses formed in said ends adjoining the bore thereof, bodies adapted for variable connection with pipes and having nipples arranged to enter the said recesses, a cross bar engaging said bodies on the ends thereof opposite the nipples, and means connecting said cross bar and web.

2. In a pipe connection of the class described, the combination with parallel pipes having adjoining threaded ends, of nuts screwed on the said threaded ends of the pipes and alined transversely with each other, the said nuts having cylindrical portions at the ends thereof, a bend body having shouldered portions at the ends thereof adapted to fit over the cylindrical portions of the nuts, gaskets of compressible material arranged in recesses in the bend body adjoining the ends of the said portions of the nuts, a bar having forked ends adapted to engage the end faces of the nuts opposite the cylindrical portions thereof, and a single bolt connecting said bar and the bend body.

3. In a pipe connection of the class described, the combination with parallel pipes, of bodies adjustably secured upon the ends of the pipes, the said bodies having cylindrical nipple portions adjoining the ends of the pipes and the pipes extending through and protruding from said nipple portions, a bend body comprising a semi-annular body having outwardly shouldered end portions with annular recesses formed therein to fit over the nipple portions of the bodies secured upon the pipes, gaskets disposed in said annular recesses adjoining the ends of the nipple portions and the protruding ends of the pipes, a cross bar engaging the bodies secured upon the ends of the pipes, and a single bolt connecting said cross bar and the bend body to draw the body toward the ends of the nipples and compress the gaskets.

In testimony whereof I have hereunto subscribed my name in the presence of two witnesses.

JAMES ALLAN.

Witnesses:
 Roy G. Kratz,
 D. O. Barnell.